United States Patent
Pederson et al.

(10) Patent No.: US 11,770,996 B2
(45) Date of Patent: Oct. 3, 2023

(54) HOUSING FOR A MODULAR METER ASSEMBLY OF A DRY PRODUCT APPLICATOR

(71) Applicant: CNH Industrial America LLC, New Holland, PA (US)

(72) Inventors: Nicholas R. Pederson, Willmar, MN (US); Jeffrey S. Martin, Benson, MN (US); John P. Honermann, Benson, MN (US); John P. Kennedy, Willmar, MN (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 702 days.

(21) Appl. No.: 16/780,292

(22) Filed: Feb. 3, 2020

(65) Prior Publication Data
US 2021/0235610 A1    Aug. 5, 2021

(51) Int. Cl.
*A01C 7/12*     (2006.01)
*A01B 79/00*    (2006.01)
*A01B 35/00*    (2006.01)

(52) U.S. Cl.
CPC .............. *A01C 7/123* (2013.01); *A01B 35/00* (2013.01); *A01B 79/00* (2013.01)

(58) Field of Classification Search
CPC ......... A01B 35/00; A01B 79/00; A01C 7/127; A01C 7/126; A01C 7/125; A01C 7/124; A01C 7/122; A01C 7/12; A01C 7/123
See application file for complete search history.

(56) References Cited

U.S. PATENT DOCUMENTS

| | | | |
|---|---|---|---|
| 4,259,912 A * | 4/1981 | Stocks | A01C 7/08 111/178 |
| 4,705,220 A * | 11/1987 | Gandrud | A01C 7/123 239/654 |
| 5,601,209 A | 2/1997 | Barsi et al. | |
| 5,845,818 A * | 12/1998 | Gregor | A01C 7/081 222/414 |

(Continued)

FOREIGN PATENT DOCUMENTS

| | | |
|---|---|---|
| CN | 107367316 | 11/2017 |
| DE | 102015103379 | 9/2016 |
| WO | WO2018184896 | 10/2018 |

*Primary Examiner* — Jamie L McGowan
(74) *Attorney, Agent, or Firm* — Rebecca Henkel; Rickard DeMille

(57) ABSTRACT

Modular meter units for distributing particulate material from an applicator can be configured to combine with each other without the use of tools to provide specific meter assembly lengths based on desired flow rates. In one aspect, modular meter unit housings with interlocking features can provide build options for assembling different sized meter assemblies. The modular meter unit housings can allow stacking and connecting multiple adjacent meter units to make a meter assembly of a particular length/volume/flow rate. Each meter unit housing can have a longitudinal bore that opens through opposing end walls and define a cylindrical cavity or chamber that can receive a cylindrical/tubular sleeve or liner. Matching openings on opposite top/bottom walls of the modular meter unit housing can align with openings of the liner to define an inlet and outlet for the meter unit.

15 Claims, 15 Drawing Sheets

(56) References Cited

U.S. PATENT DOCUMENTS

| | | | | |
|---|---|---|---|---|
| 5,855,303 A * | 1/1999 | Gregor | ............... | G01F 11/24 239/650 |
| 5,878,679 A * | 3/1999 | Gregor | ............... | A01C 15/04 111/178 |
| 5,980,163 A * | 11/1999 | Gregor | ............... | A01C 7/081 406/144 |
| 6,138,591 A * | 10/2000 | Horsch | ............... | A01C 19/02 111/178 |
| 7,428,874 B2 * | 9/2008 | Jones | ............... | A01C 7/122 111/182 |
| 8,286,481 B2 | 10/2012 | Roehrig et al. | | |
| 8,701,576 B2 | 2/2014 | Friggstad | | |
| 9,144,190 B2 * | 9/2015 | Henry | ............... | A01C 7/088 |
| 9,420,738 B2 * | 8/2016 | Walter | ............... | A01C 7/127 |
| 9,801,330 B2 | 10/2017 | Bent et al. | | |
| 9,844,174 B2 | 12/2017 | Gervais et al. | | |
| 11,457,555 B2 * | 10/2022 | Pederson | ............... | A01C 7/081 |
| 11,457,556 B2 * | 10/2022 | Ruppert | ............... | A01C 7/123 |
| 2010/0307394 A1 * | 12/2010 | Snipes | ............... | A01C 7/127 111/11 |
| 2012/0067258 A1 * | 3/2012 | Maro | ............... | A01C 7/125 111/11 |
| 2013/0192503 A1 * | 8/2013 | Henry | ............... | A01C 7/082 111/14 |
| 2015/0216109 A1 * | 8/2015 | Meyer | ............... | A01C 19/02 222/333 |
| 2015/0319917 A1 * | 11/2015 | Henry | ............... | A01C 7/081 111/174 |
| 2015/0319918 A1 * | 11/2015 | Henry | ............... | A01C 19/02 111/174 |
| 2016/0120110 A1 | 5/2016 | Gervais et al. | | |
| 2016/0135361 A1 * | 5/2016 | Swanson | ............... | A01C 7/081 406/108 |
| 2016/0330901 A1 * | 11/2016 | Arnold | ............... | G01F 11/24 |
| 2019/0037764 A1 * | 2/2019 | Garner | ............... | A01C 7/102 |
| 2019/0090416 A1 * | 3/2019 | Schembri | ............... | A01C 15/007 |
| 2019/0357423 A1 * | 11/2019 | Denis | ............... | A01C 7/082 |
| 2019/0387665 A1 * | 12/2019 | Finlayson | ............... | A01C 7/123 |
| 2020/0229342 A1 * | 7/2020 | Stöcklin | ............... | A01C 19/02 |
| 2021/0235610 A1 * | 8/2021 | Pederson | ............... | A01C 7/124 |
| 2021/0278265 A1 * | 9/2021 | Ruppert | ............... | G01F 11/24 |

* cited by examiner

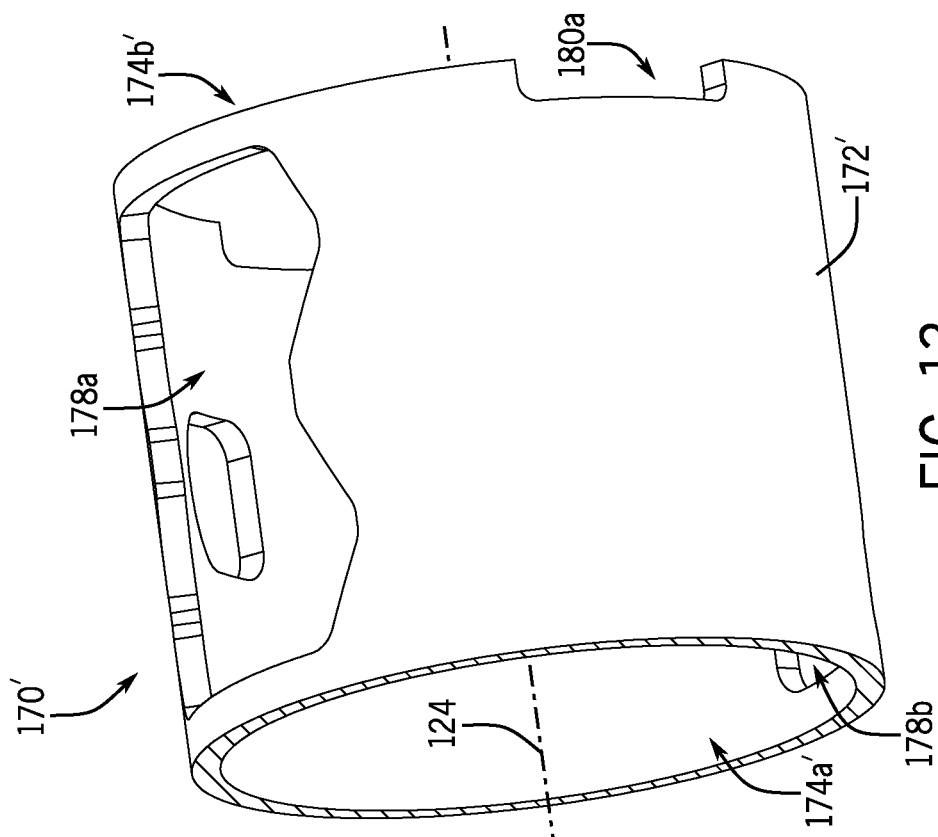
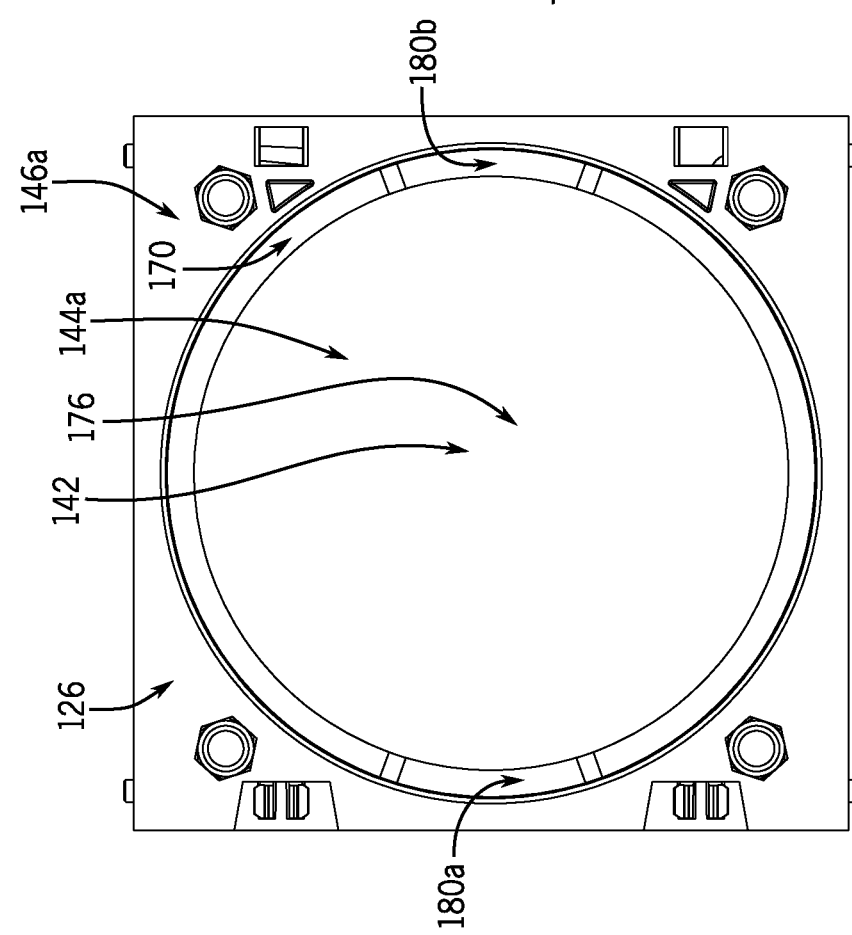
FIG. 13
FIG. 12

HOUSING FOR A MODULAR METER
ASSEMBLY OF A DRY PRODUCT
APPLICATOR

FIELD OF THE INVENTION

The present invention pertains to agricultural equipment and, more specifically, to a meter housing for a modular meter assembly for distributing particulate material which includes a frame having multiple openings, each opening being arranged to expose an interior cavity of the frame, and an interconnection system provided symmetrically on the frame, the interconnection system being configured to allow the frame to attach to additional frames.

BACKGROUND OF THE INVENTION

Agricultural product delivery systems are known to utilize various mechanisms, including mechanical and pneumatic systems to move granular or particulate material or product, such as fertilizer, seed, insecticide or herbicide, from a product supply chamber, through a series of elongated tubes that extend from a product supply chamber to a product applicator, and placing the product on, or in a growing medium, such as soil. Such agricultural product delivery systems are commonly employed in planters, air drills, fertilizer and pesticide applicators and a variety of other agricultural implements.

Systems as described typically include meter assemblies for metering the particulate material. To provide different flow rates, such meter assemblies are oftentimes provided in different sizes on the same machine. However, providing meter assemblies in different sizes requires tooling for and inventorying of each of the different sizes. This can add time, complexity and cost to the manufacture and maintenance of the different meter assemblies. Furthermore, a substantial amount of material is often required to produce typical meter assemblies with each having interconnected walls forming continuous housings for internal meter wheel systems. This can result in excess cost and waste of material. A need therefore exists to provide a system for metering of particulate material that eliminates one or more of the foregoing disadvantages.

SUMMARY OF THE INVENTION

Modular meter units for distributing particulate material from an applicator can be configured to combine with each other without the use of tools to provide specific meter assembly lengths based on desired flow rates. In one aspect, modular meter unit housings with interlocking features can provide build options for assembling different sized meter assemblies. The modular meter unit housings can allow stacking and connecting multiple adjacent meter units to make a meter assembly of a particular length/volume/flow rate. Each meter unit housing can have a longitudinal bore that opens through opposing end walls and define a cylindrical cavity or chamber that can receive a cylindrical/tubular sleeve or liner. Matching openings on opposite top/bottom walls of the modular meter unit housing can align with openings of the liner to define an inlet and outlet for the meter unit. Another pair of openings on opposite sidewalls of the modular meter unit housing can provide material reduction and be covered by solid segments of the liner's circumferential wall. Crush ribs on the inner surface of the bore can deform during press insertion of the liner to lock the liner in place. Adjacent meter unit houses can be longitudinally stacked and connected to each other to form larger meter assemblies. Locking tabs/fingers can extend from one side of each end wall of the meter unit housing. Receptacles can be arranged at the other side of each end wall to receive the locking tabs/fingers of an adjacent meter unit housing. This can provide a tool-less snap-lock connection between the adjacent stacked meter unit housings. Each meter unit housing can have screw bosses at end walls that can receive/capture nuts at end walls of outermost meter units for mounting bearing caps.

Accordingly, since each meter unit housing has the same locking tabs/fingers, receptacles, and screw bosses, each meter unit housing can be arranged in any order or longitudinal position within the stack that forms the overall meter assembly. Design symmetry of each meter unit housing can provide non-directionality that presents the same feature orientation of adjacent meter unit housings regardless of the particular orientation of each meter unit housing. There is no upside-down or backwards orientation for the meter unit housings, which can speed up and reduce the possibility of mistakes during assembly.

In another aspect, a tubular sleeve for a modular meter system for distributing particulate material from an applicator can be inserted through a meter assembly that is built from modular meter unit housings to define the boundary wall of a meter cavity and provide internal structural support for the meter assembly. The tube can be provided with inlet and outlet openings that can be inserted through modular meter housings to form an overall meter assembly of a particular length and therefore volume/flow rate. In one aspect, a tube or tubular sleeve can be inserted into a stack of connected meter units while assembling a modular meter assembly. A circumferential sidewall of the tube can have pairs of oppositely positioned openings that provide inlets and outlets for a meter assembly. Cutouts at ends of sleeves can provide recesses or pockets into the end edges that receive protrusions from back walls of bearing caps at ends of the meter assembly.

Accordingly, the tube can provide substantial internal structural support to the entire meter assembly. This can allow tool-less and substantially fastener-free assembly of meter unit housings to each other while maintaining structural integrity of the overall meter assembly. The end cutouts interlock with the bearing cap protrusions in a manner that locks the tube against rotation. This ensures that the tube's inlets/outlets stay aligned with the meter assembly housing's inlets/outlets to prevent frictional dragging of the tube into rotation which could close the inlets/outlets. The tube's side wall openings on opposite sides are 180-degrees from each other and have the same shape and size. The tube's end cutouts are also 180-degrees from each other and have the same shape and size. This give the tube a symmetrical configuration with no upside-down and backwards orientation, which speeds up and reduces mistakes during assembly.

In another aspect, a bearing end cap for a modular meter assembly for distributing particulate material from an applicator can include recesses that accommodate locking tabs or fingers of modular meter unit housings and protrusions that lock a meter tube against rotation. In one aspect, a bearing end cap can be provided with a particular construction that cooperates with modular meter unit housings. The bearing end cap can have vertical and horizontal symmetry and cutouts near its corners. These cutouts can provide clearances to accommodate the locking tabs or fingers of modular meter unit housing end walls. Back walls of the bearing end caps can have protrusions that extend into end cutouts of a tube which defines an interior perimeter of the meter assembly.

Accordingly, accommodating the locking tabs or fingers in the bearing end cap corner cutouts can eliminate the need to remove the locking tabs or fingers from the outer meter unit housings. This can reduce assembly time. A face-to-face engagement between outer meter unit housing(s) and bearing end cap(s) can be ensured, even though outer meter unit housing(s) may have exposed protrusions. A symmetrical configuration of the bearing end cap provides no upside-down orientation, which can speed up and reduce the possibility of mistakes during assembly.

In another aspect, a meter wheel system for a dry agricultural product applicator can include a bank of meter assemblies made from modular meter units. In one aspect, each meter assembly in the bank can be made from modular meter units. The modular meter units can be connected in a stacked configuration to provide a specific overall length to achieve a corresponding flow rate and then banked together to form the system. A bank of meter assemblies made from modular meter units can be secured between top and bottom plates. The plates can be bolted to each other and have receptacles that receive protrusions from top and bottom surfaces of the meter assemblies. Lengths of meter assemblies can be picked based on particular delivery rates for the section it feeds. An overall length of each meter assembly can be a multiple of a length of the modular meter unit. In one example, a modular meter unit can be 4" to allow the meter assemblies to be assembled to overall lengths in 4" increments, such as 20", 12", 8" or 4", depending on the number of modular meter units implemented in the stack that defines the meter assembly. Each meter assembly can have a segmented meter wheel assembly with multiple meter wheels that correspond to the number of modular meter units. Each meter wheel can have a central bushing with a hex shape inner perimeter profile that fits over a hex shaft. A meter wheel body with flutes or vanes such as helical or straight vanes can be molded over the bushing. Spacer disks can be mounted on the hex shaft between adjacent meter wheels to confine the product within the vanes of the particular meter wheel. The hex shaft can have paired snap rings that capture a bearing on one end to allow unitized withdrawal/insertion of an entire rotating assembly mounted to the shaft by removing the corresponding bearing end cap.

Accordingly, the system modularity can reduce tooling and inventory requirements. The segmented helical or straight fluted meter wheels can be separated by spacer disks that prevent augering or spiral advancing of materials along adjacent meter wheels. This can limit pulsation or dropping material out in piles. The paired snap rings at one end of the meter wheel assembly hex shaft can improve serviceability by allowing withdrawal of the entire meter wheel assembly for cleaning clogged vanes or performing other service tasks without having to disassemble adjacent meter assemblies to access the one(s) that needs servicing.

Specifically then, one aspect of the present invention can provide a meter housing for a modular meter assembly for distributing particulate material from an applicator. The meter housing can include: a frame having multiple openings, each opening being arranged to expose an interior cavity of the frame, the openings including: first and second openings arranged on first and second sides of the frame, respectively, the first and second sides being opposing sides of one another along a longitudinal axis of the frame, the first and second openings being configured to receive a meter wheel for placement in the interior cavity; and third and fourth openings arranged on third and fourth sides of the frame, respectively, the third and fourth sides being opposing sides of one another transverse to the longitudinal axis, the third and fourth openings being configured to provide an inlet and an outlet, respectively, relative to a meter wheel when placed in the interior cavity; and an interconnection system provided symmetrically on the first and second sides of the frame, the interconnection system being configured to allow the frame to attach to additional frames on the first and second sides.

Another aspect of the present invention can provide a support element for a modular meter assembly for distributing particulate material from an applicator. The support element can include: a tubular sleeve having first and second ends and multiple openings, the first and second ends being configured to receive a meter wheel for placement in an interior cavity of the sleeve, the openings being arranged to expose the interior cavity, the openings including first and second openings arranged on opposing sides of one another along a longitudinal axis of the sleeve, the first and second openings being configured to provide an inlet and an outlet, respectively, relative to a meter wheel when placed in the interior cavity. The tubular sleeve can further include a locking element configured to prevent rotation of the sleeve relative to a meter housing when the sleeve is contained in the meter housing.

Another aspect of the present invention can provide an end cap for a modular meter assembly for distributing particulate material from an applicator. The end cap can include: a plate including multiple openings, the openings including: a central opening configured to support a bearing assembly and a rotatable shaft for rotating a meter wheel when the plate is mounted to a meter housing containing a meter wheel; and multiple fastener openings, each fastener opening being smaller than the central opening, each fastener opening being configured to receive a fastener for mounting the plate normal to a meter housing. The plate can further include a locking element configured to prevent rotation of a tubular sleeve relative to a meter housing when the plate is mounted to a meter housing containing a tubular sleeve.

Another aspect of the present invention can provide a metering bank for distributing particulate material from an applicator. The metering bank can include: multiple modular meter assemblies connected to one another along a longitudinal axis, each modular meter assembly including a meter housing and a meter wheel, each meter housing including a frame having multiple frame openings, the frame openings including first and second frame openings arranged on first and second sides of the frame, respectively, the first and second sides being opposing sides of one another transverse to the longitudinal axis, the first and second frame openings being configured to provide an inlet and an outlet, respectively, relative to the meter wheel; a rotatable shaft arranged through the modular meter assemblies along the longitudinal axis, the rotatable shaft being configured to rotate the meter wheel of each modular meter assembly; and an end cap attached to a first modular meter assembly of the modular meter assemblies, the end cap being configured to retain the rotatable shaft relative to the longitudinal axis.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings:

FIG. 12 illustrates a front view of the plurality of meter housings and support element of FIG. 11;

FIG. 13 illustrates an isometric view of a support element which could be contained in a single meter housing in accordance with an aspect of the invention;

While the invention is described herein in connection with certain preferred embodiments, there is no intent to limit it to those embodiments. On the contrary, the intent is to cover all alternatives, modifications and equivalents within the spirit and scope of the invention as defined by the appended claims.

DETAILED DESCRIPTION OF THE DRAWINGS

Figure 1:
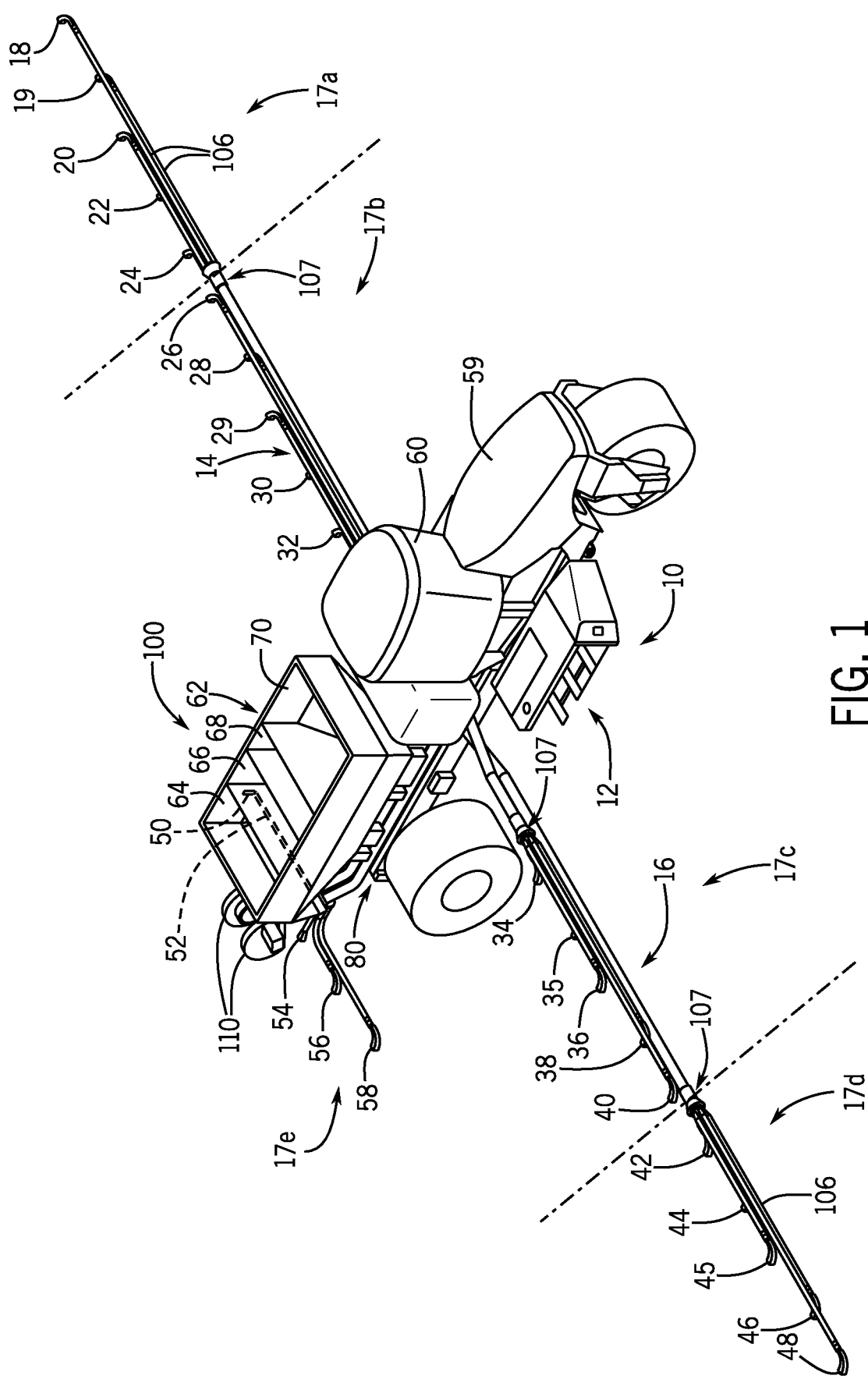
FIG. 1 illustrates an isometric view of an exemplary embodiment of an agricultural application implement in the form of a dry product applicator, comprising a metering section in accordance with an aspect of the invention.
Figure 2:
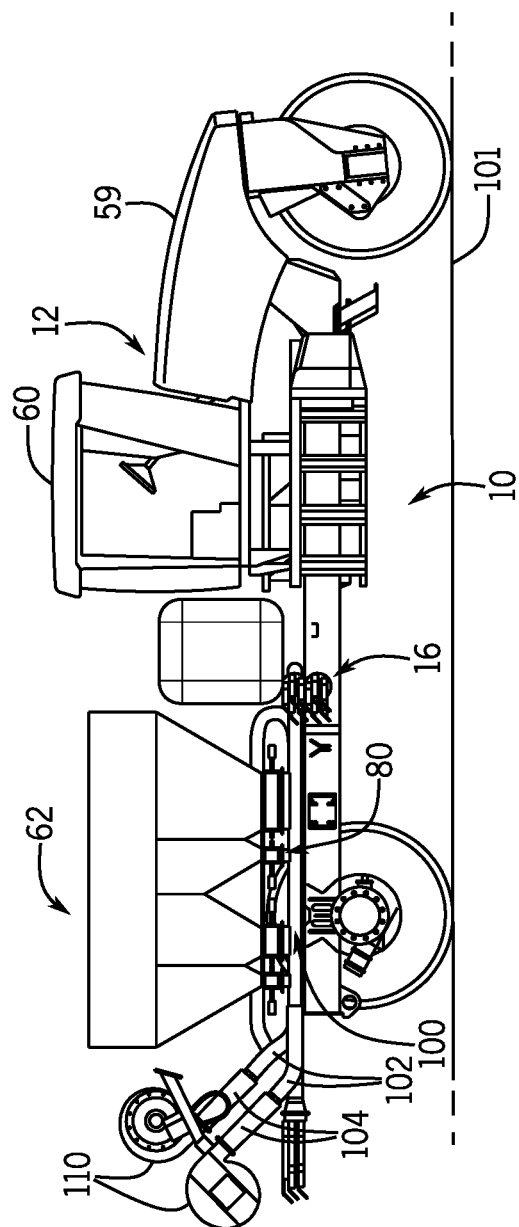
FIG. 2 illustrates a side elevation view of the applicator of FIG. 1, in accordance with an aspect of the invention.

Referring now to the drawings, and more particularly to FIGS. 1 and 2, there is shown an agricultural application implement 10, which could be a dry pneumatic granular applicator. As is known in the art, implement 10 generally includes a large wheeled transport unit 12 such as truck or tractor, and laterally extending particle delivery booms 14 and 16, which may be pivoted to a stowed position close to the implement for storage or transport. Each boom 14, 16 extends laterally from the implement 10 in opposite directions. Each boom 14, 16 includes a plurality of boom sections 17, such as left outer and left inner boom sections 17a, 17b of boom 14, and right inner and right outer boom sections 17c, 17d of boom 16. Each boom section 17 is defined by a large diameter supply line 102 for supplying the boom section with granular or particulate material, such as seed, fertilizer, herbicide, insecticide and the like. Each boom section 17 includes a plurality of boom tubes or conduits terminating at particle delivering units, which for the implement 10 are spreading outlets or nozzles. In the exemplary embodiment shown, left outer boom section 17a of boom 14 includes five nozzles 18, 19, 20, 22 and 24; left inner boom section 17b of boom 14 includes five nozzles 26, 28, 29, 30 and 32; right inner boom section 17c of boom 16 includes five nozzles 34, 35, 36, 38 and 40; and right outer boom section 17d of boom 16 includes five nozzles 42, 44, 45, 46 and 48. Additionally, at the back of implement 10 there is a centrally mounted rear boom section 17e also defined by a large diameter supply line 102 for supplying the boom section with granular material. At the rear boom section 17e are five rear nozzles 50, 52, 54, 56 and 58 to provide full and complete coverage across the width of implement 10, including the area between the inboard-most nozzles 32 and 34 of booms 14, 16. The rear boom section 17e allows spread of the particulate material/product over/onto the ground over which the implement 10 passes for complete coverage. Although five boom sections 17, with five nozzles per boom section, is shown by way of example, in other aspects greater or fewer boom sections 17, and/or greater or fewer nozzles per boom section 17, can be provided within the scope of the invention. Although shown and described with five nozzles per section, in other aspects, more nozzles per section, such as six nozzles per section, or fewer nozzles per section, could be present The transport unit 12 can be self-propelled by an engine in an engine compartment 59 and can include an operator cab 60 having a Human Machine Interface (HMI) available to the user. In the exemplary embodiment shown, an uncovered tank 62 includes compartments 66 and 70 for carrying particulate material to be distributed in a metering section 80 for ultimate disbursement by nozzles 18-58. Further smaller compartments 64 and 68 are provided to supply micronutrients or other materials in the metering section 80. The supply of particulate in compartments 64, 66, 68, 70 can be replenished periodically from a supply vehicle (not shown).

Figure 3:
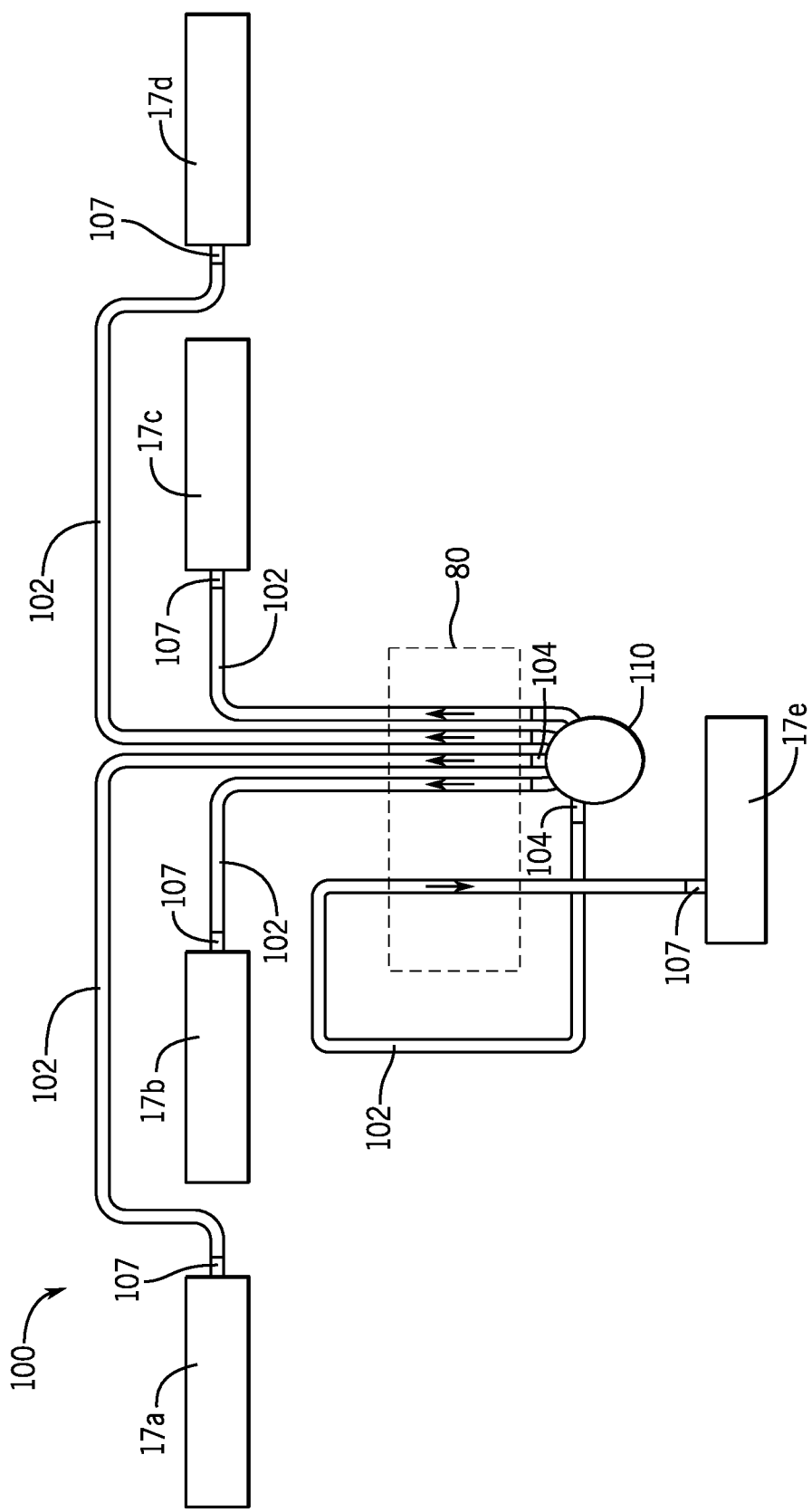
FIG. 3 illustrates a pneumatic conveying system of the applicator of FIG. 1 for distributing particulate material through boom sections in accordance with an aspect of the invention.

As shown in FIGS. 1-3 by way of example, the compartments 64-70 of the tank 62 and the metering section 80 are disposed directly above a conveying system 100, which could be a pneumatic conveying system or assembly. The conveying system 100 includes multiple large diameter supply lines 102, which could be 5 inches in diameter, that extend from a plenum 104 at one end, under the compartments 64-70 and terminate at individual boom sections 17. At each boom section 17, the supply lines 102 and the particulate material or product transported therein are split by a suitable distribution structure or mechanism 107, such as a plurality of horizontal rotary distributors, among or into a number of secondary or smaller supply lines 106, which could be 2.5 inches in diameter, that are connected to individual nozzles 18-58.

To collect and drive the particulate material along the lines 102, one or more fans 110 can be operably connected to the plenum 104 opposite the inlet ends of lines 102 as described herein. The air flow from the fans 110 is directed from through the plenum 104 and into the respective lines 102 as a result of the structure of the plenum 104. After the air flow passes through the plenum 104 and collects/entrains the particulate material from the compartments 64-70 via the metering section 80, the air flow continues to flow along each large diameter supply line 102, including with one or more 90° and/or 180° turns, to connect to the various boom sections 17. The fans 110 could be centrifugal fans that are 8 inches or less in diameter, and in some aspects, 6 inches or less.

Figure 4:
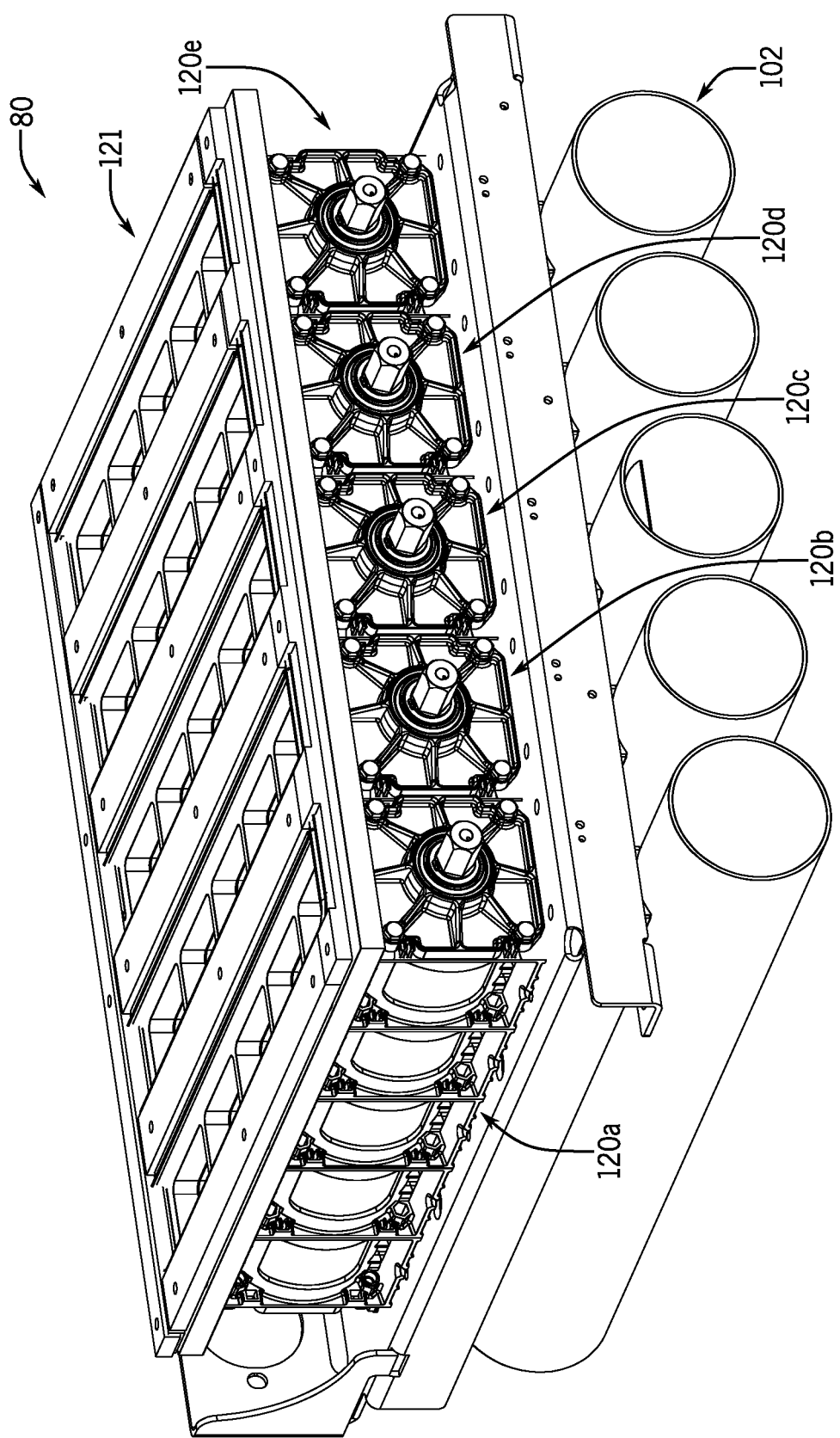
FIG. 4 illustrates an isometric view of a metering section of the applicator of FIG. 1 in accordance with an aspect of the invention.
Figure 5:
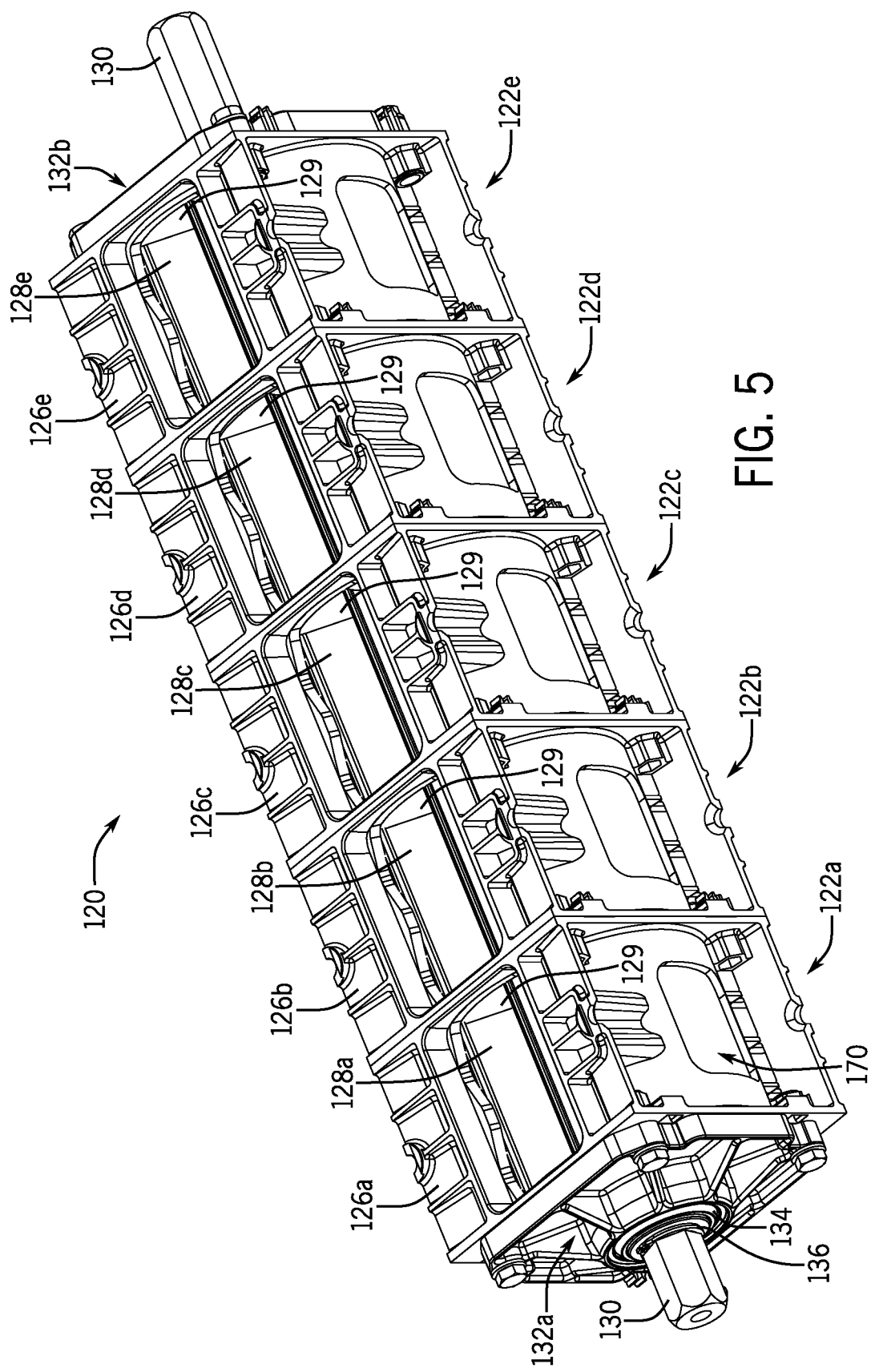
FIG. 5 illustrates an isometric view of a single metering bank, comprised of a plurality of modular meter assemblies, in the metering section of FIG. 4.
Figure 6:
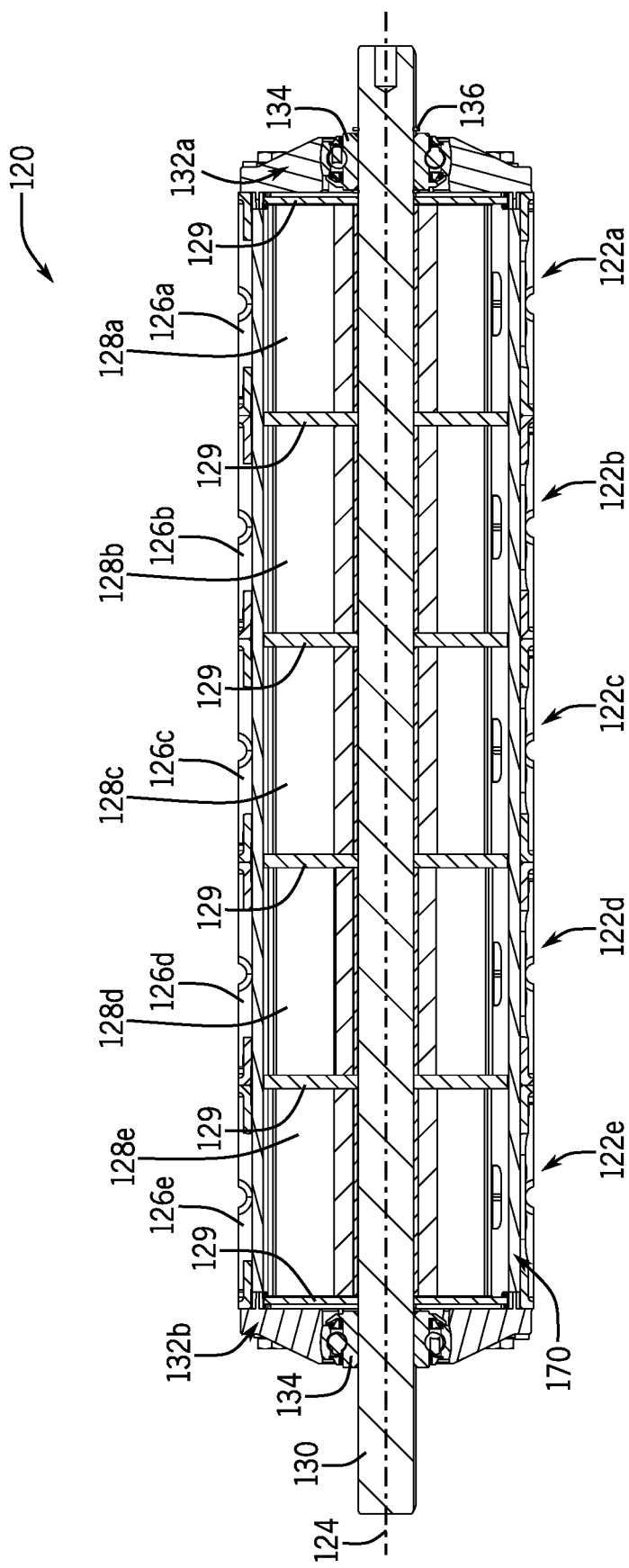
FIG. 6 illustrates a cutaway plan view of the metering bank of FIG. 5.
Figure 14:
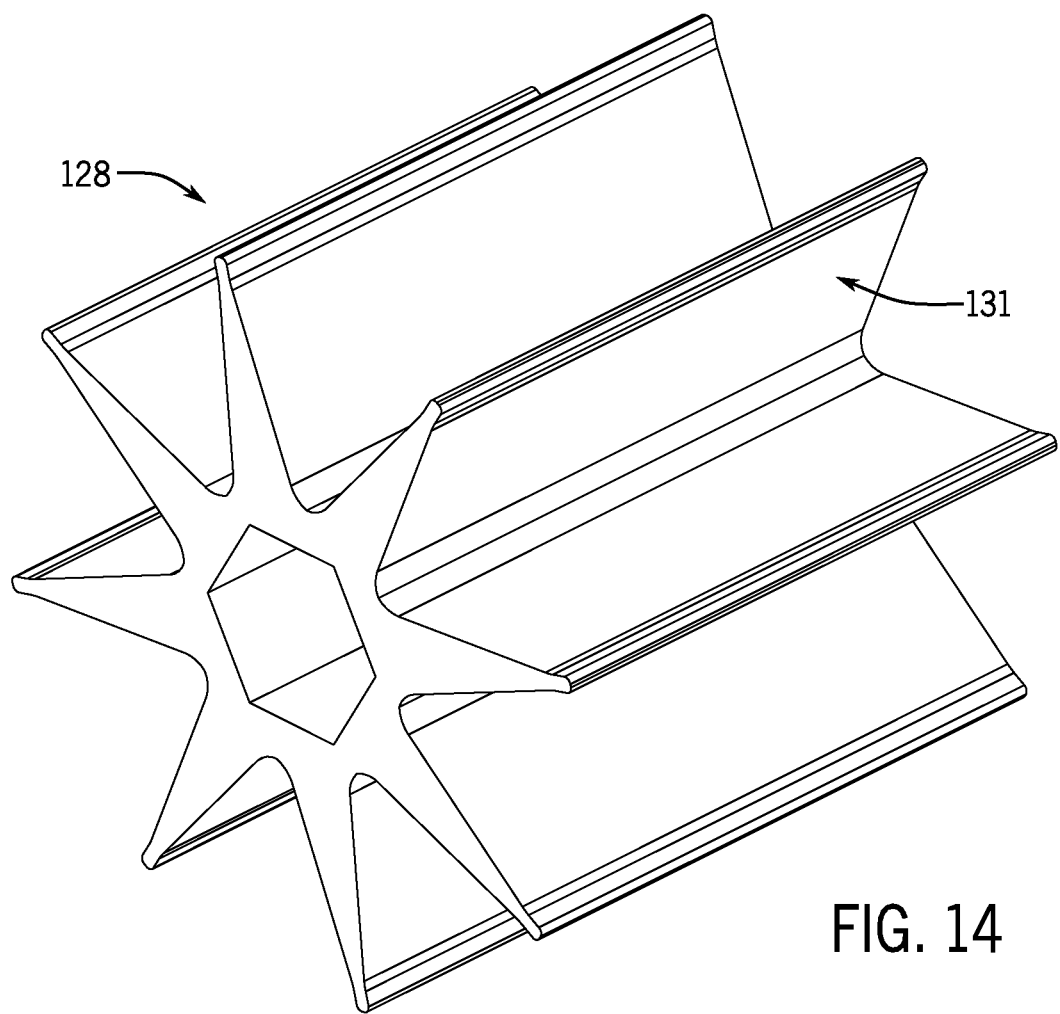
FIG. 14 illustrates an isometric view of a meter wheel which could be used in a single modular meter assembly in accordance with an aspect of the invention.
Figure 15:
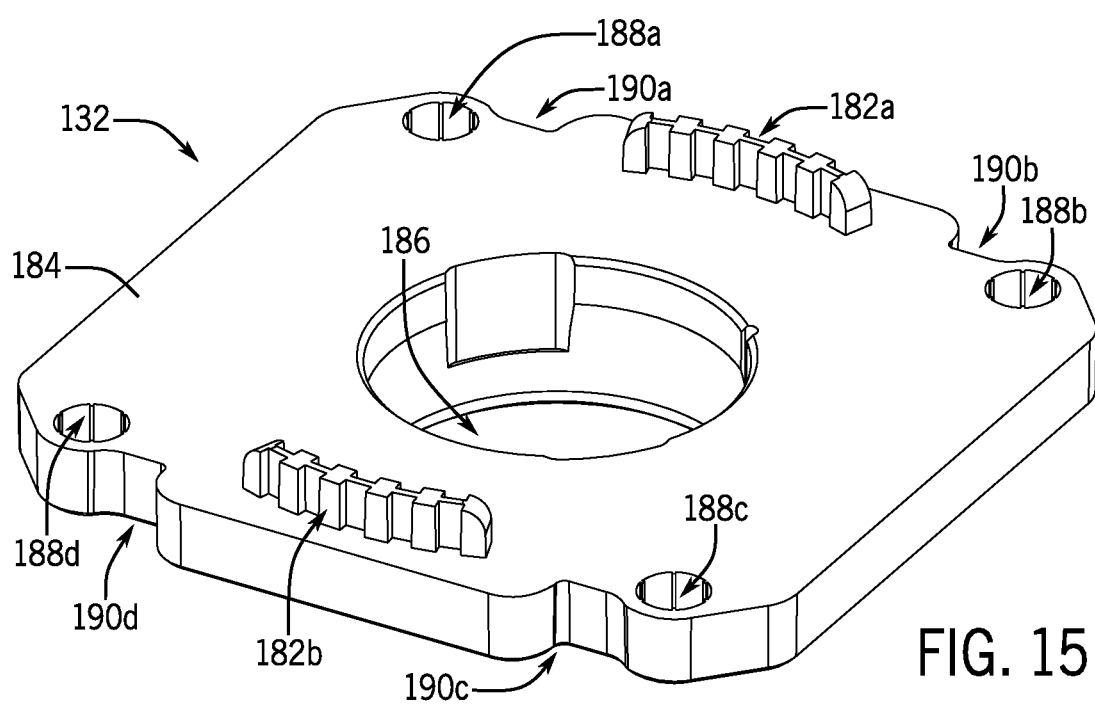
FIG. 15 illustrates an isometric view of an end cap of the metering bank of FIG. 5 in accordance with an aspect of the invention.
Figure 16:
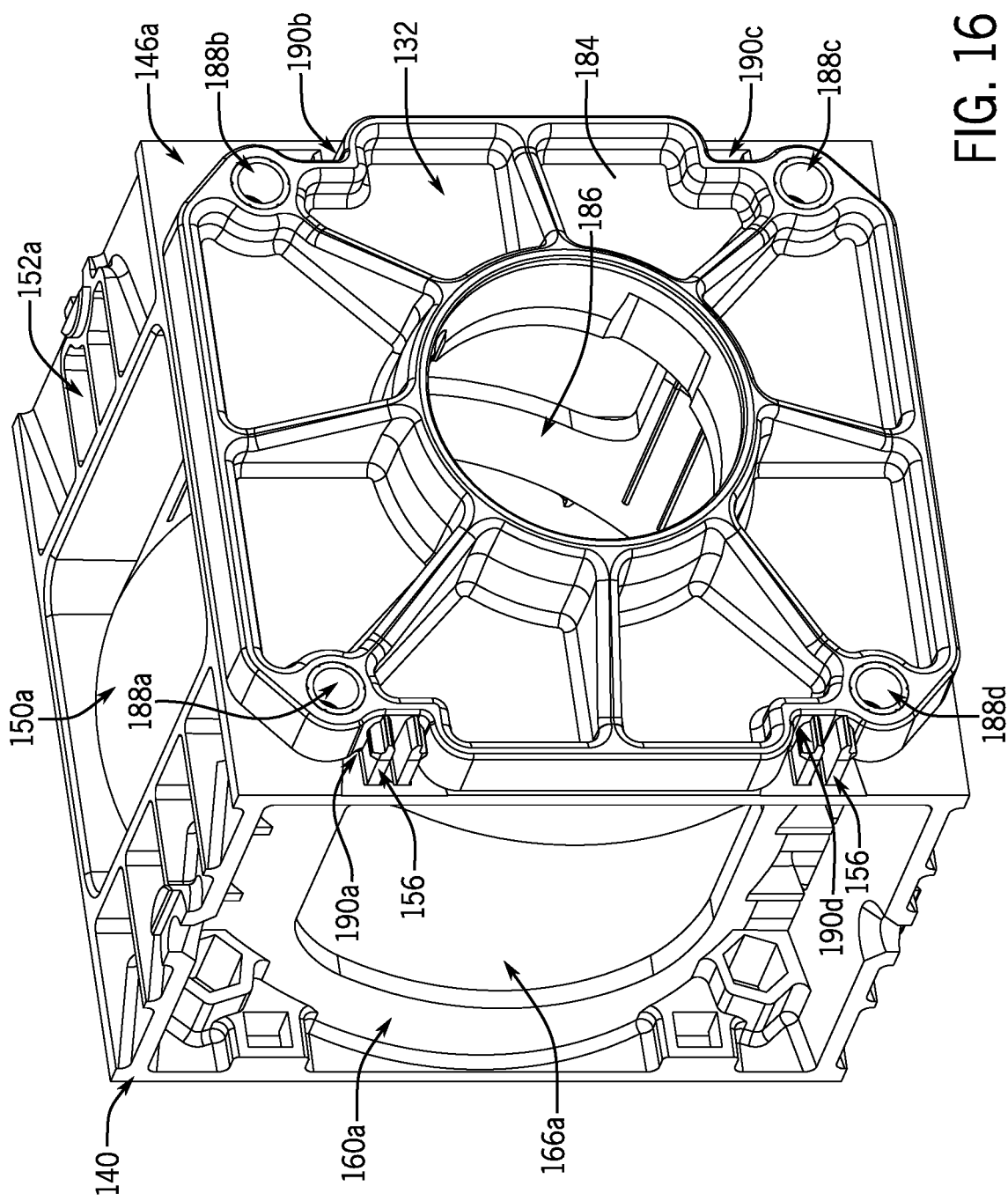
FIG. 16 illustrates an isometric view of the end cap of FIG. 15 mounted to the meter housing of FIG. 8 in accordance with an aspect of the invention.
Figure 17:
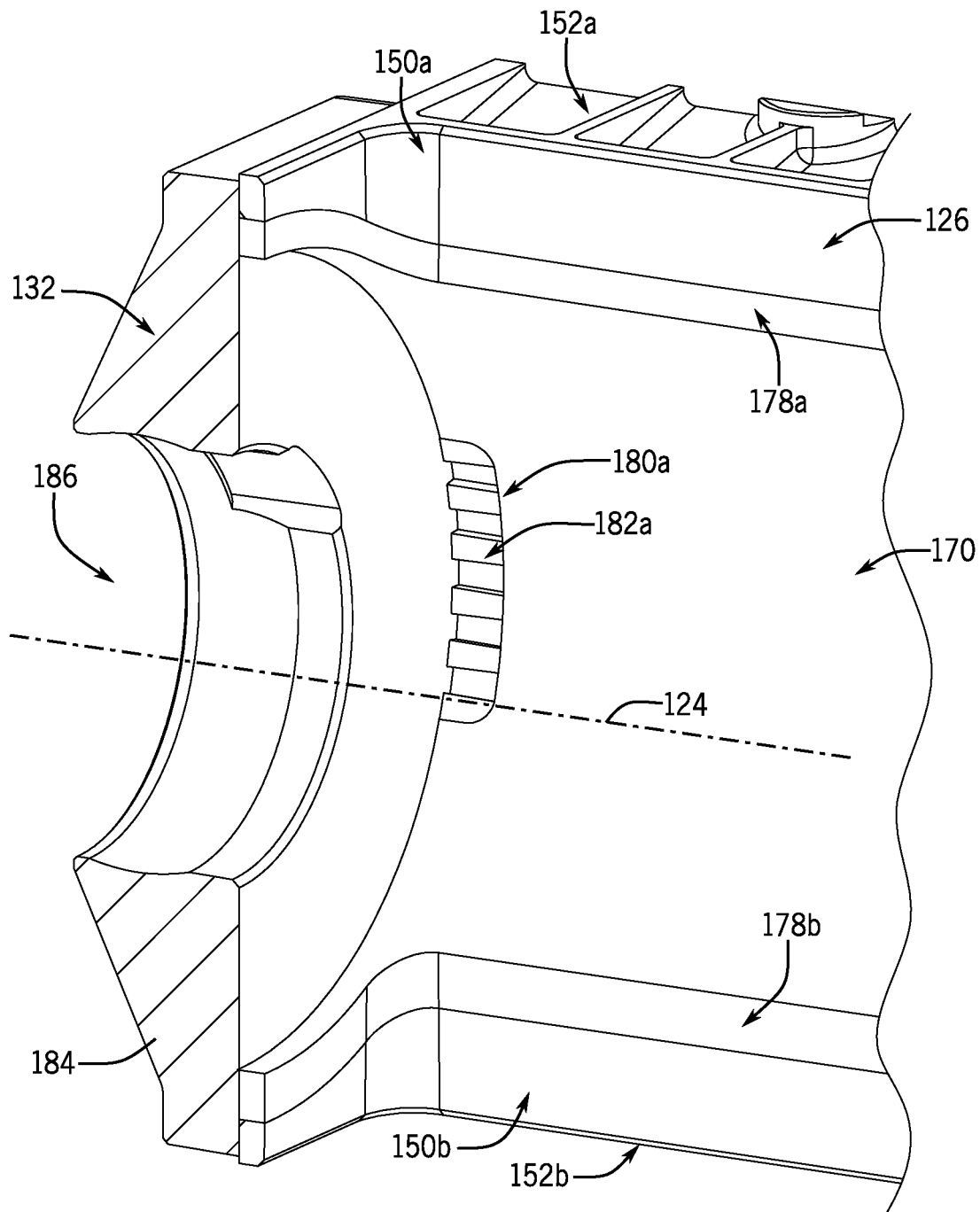
FIG. 17 illustrates an isometric cutaway view of an end cap mounted to a meter housing containing a support element in accordance with an aspect of the invention.

Referring now to FIG. 4 an isometric view of an exemplar metering section 80 is shown in accordance with an aspect of the invention. The metering section 80 could comprise multiple metering banks 120, such as the five metering banks 120a-120e as shown, for distributing particulate material from the implement 10 onto the ground. An array of electronically actuated gates 121 can be arranged above the metering banks 120 to selectively allow distribution of particulate material to various sections of each bank, from various compartments of the tank 62, as described herein. With additional reference to FIGS. 5 and 6, isometric and cutaway plan views of an exemplar metering bank 120, respectively, each metering banks 120 could comprise multiple modular meter assemblies 122, such as the five modular meter assemblies 122a-122e as shown, connected to one another along a longitudinal axis 124. Each modular meter assembly 122, in turn, could comprise a meter housing 126 (see also FIGS. 7-9), such as the five meter housings 126a-126e as shown, and a meter wheel 128 (see also FIG. 14), such as the five meter wheels 128a-128e as shown. In one aspect, each meter wheel 128 could comprise a meter wheel body with flutes or vanes 131, such as helical or straight vanes, which can be molded over a bushing. A spacer 129 can be arranged between each modular meter assembly 122 to confine particulate material received through an inlet of a given modular meter assembly 122 to the given modular meter assembly 122.

A rotatable shaft 130, which could be a hex shaft, can be arranged through each bank of modular meter assemblies 122 along the longitudinal axis 124 of the bank. Accordingly, the rotatable shaft 130 can be configured to rotate the meter wheel 128 of each modular meter assembly 122 together.

In addition, an end cap 132 (see also FIGS. 15-18) can be attached to first and/or last modular meter assemblies 122 in metering bank 120, such as a first end cap 132a attached to the meter housing 126a of the first meter assembly 122a, and a last end cap 132b attached to the meter housing 126e of the last meter assembly 122e, as shown. The end cap 132 can be configured to hold a bearing assembly 134 for supporting rotation of the rotatable shaft 130. The end cap 132 can also be configured to hold a retainer assembly 136, which could comprise a snap ring, proximal to the bearing assembly 134, for retaining the rotatable shaft 130 relative to the longitudinal axis 124, thereby preventing any inward/outward translative movement thereof along the axis.

Figure 7:
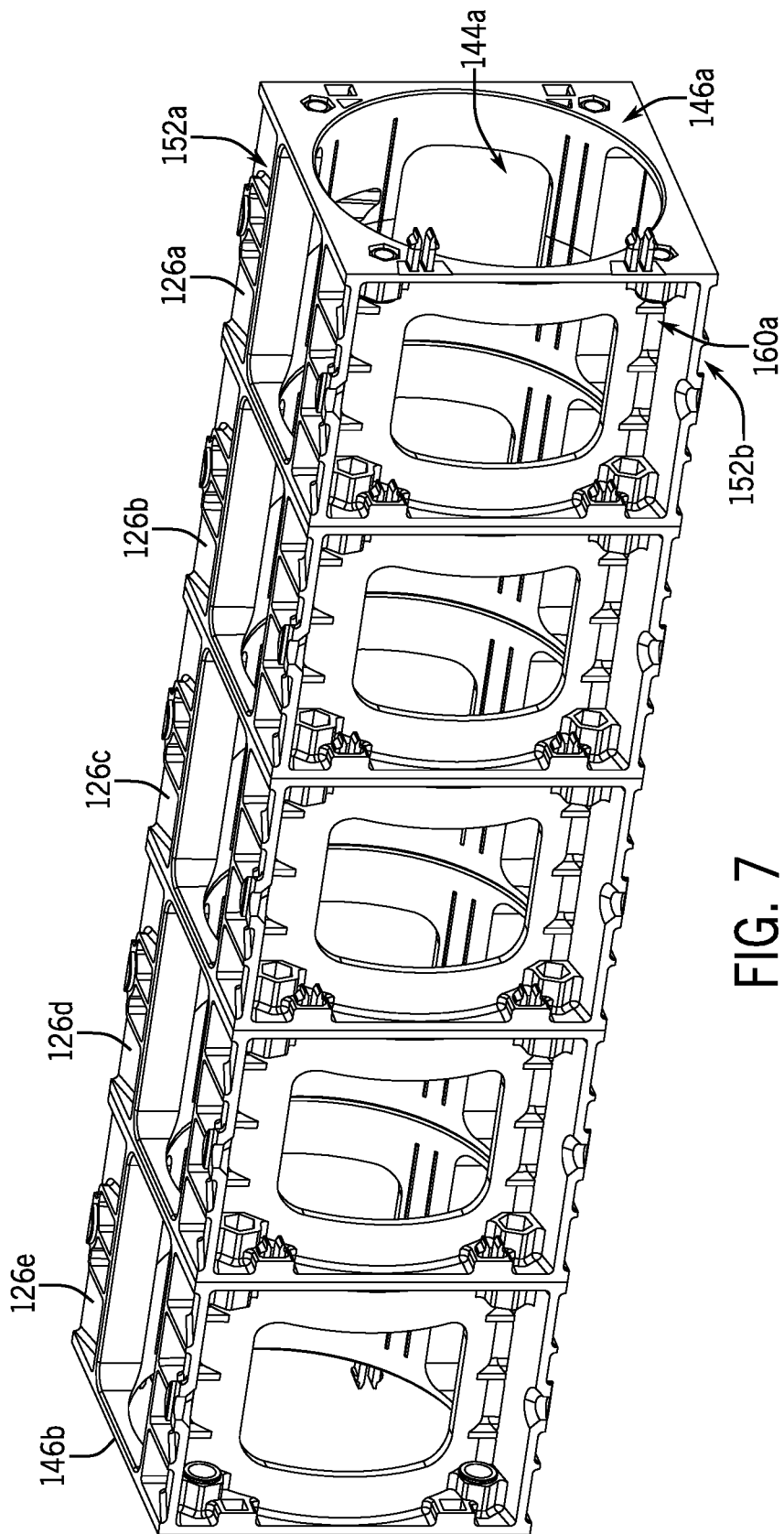
FIG. 7 illustrates an isometric view of a plurality of meter housings connected together to form a metering bank in accordance with an aspect of the invention.
Figure 8:
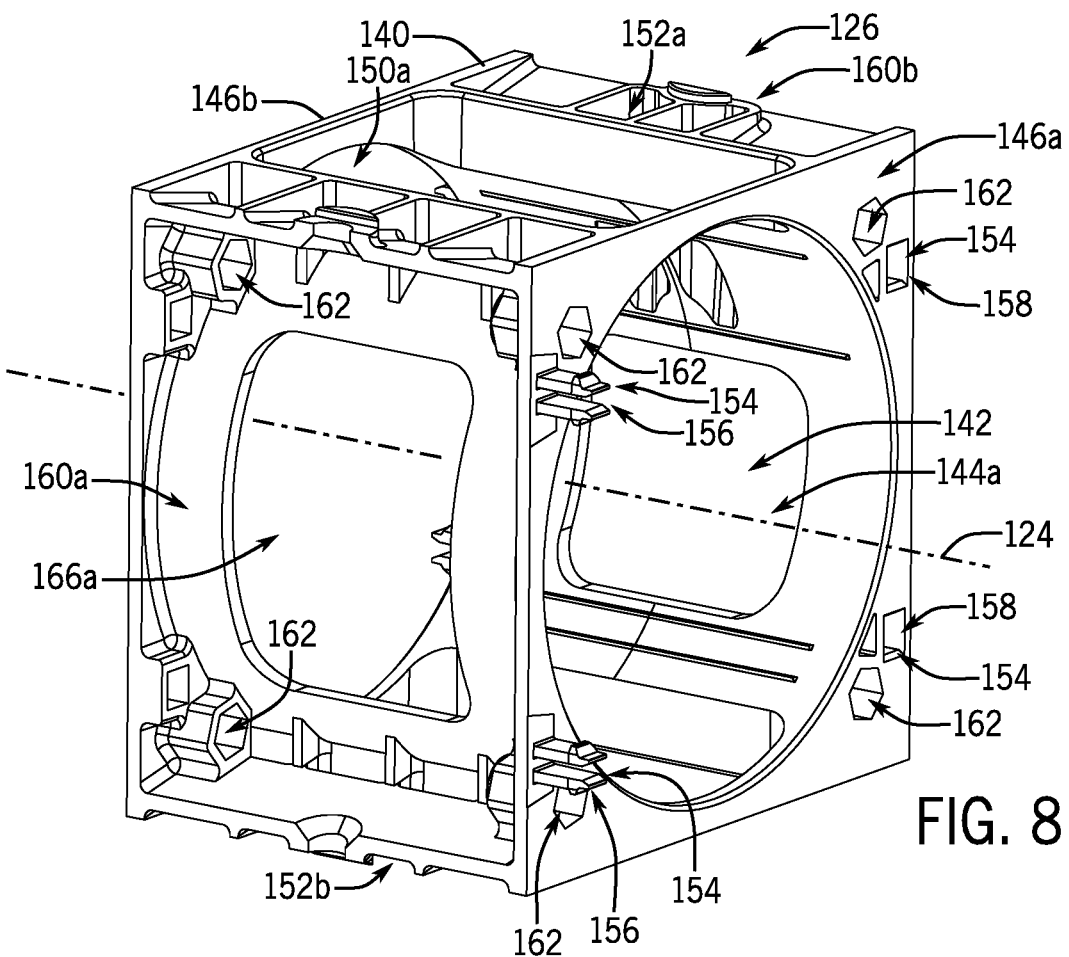
FIG. 8 illustrates an isometric view of a single meter housing in accordance with an aspect of the invention.
Figure 9:
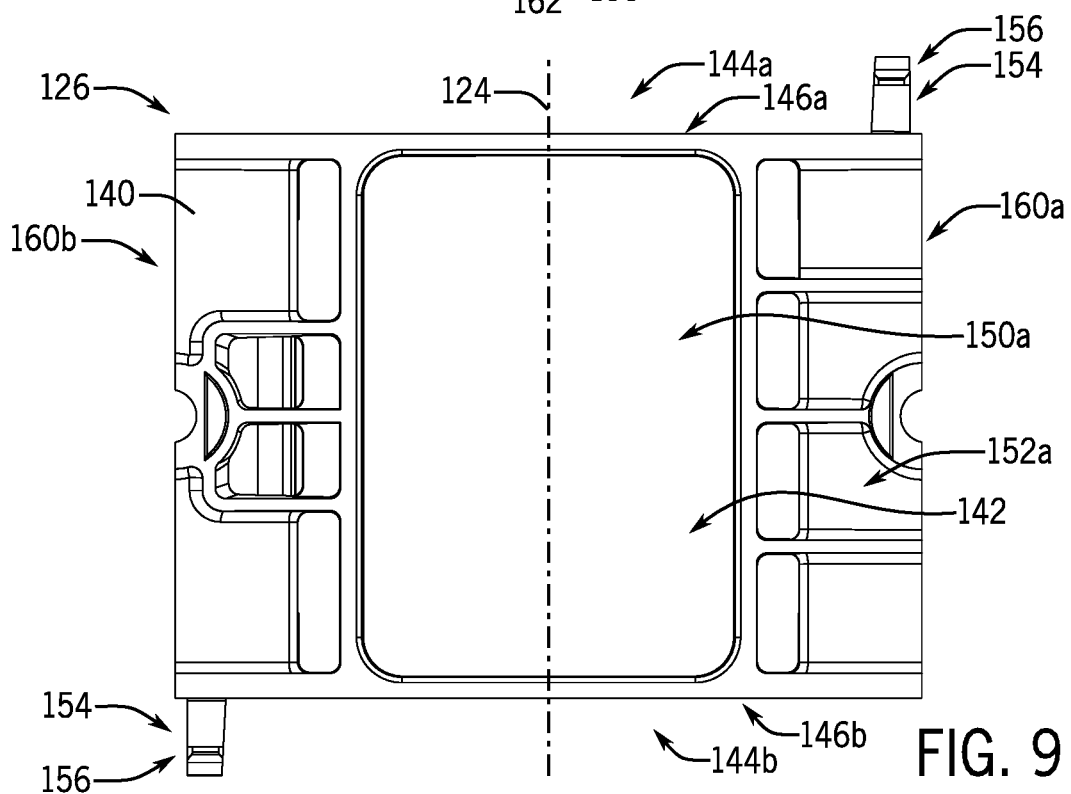
FIG. 9 illustrates a plan view of the meter housing of FIG. 8.
Figure 10:
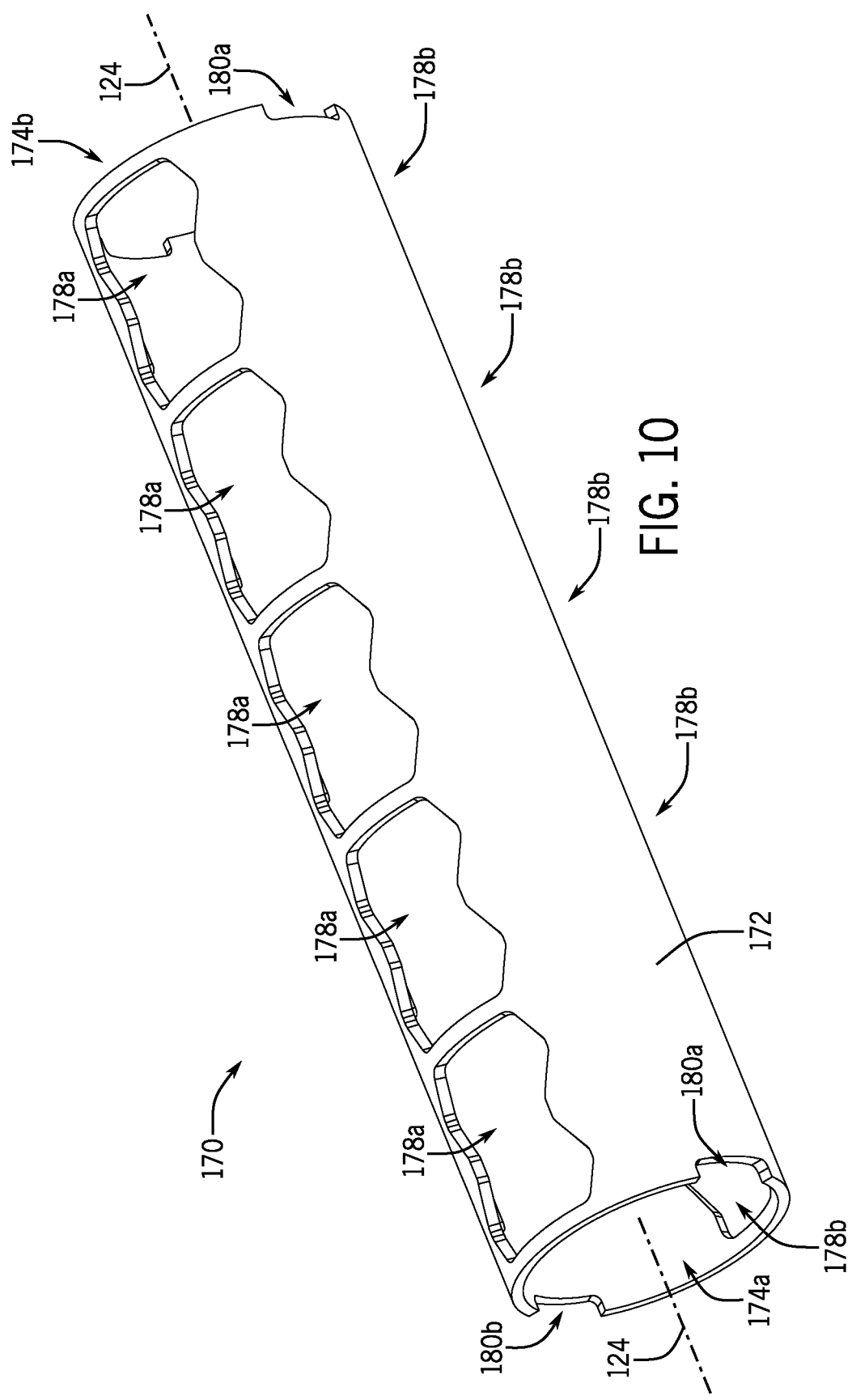
FIG. 10 illustrates an isometric view of a support element which could be contained in a metering bank in accordance with an aspect of the invention.
Figure 11:
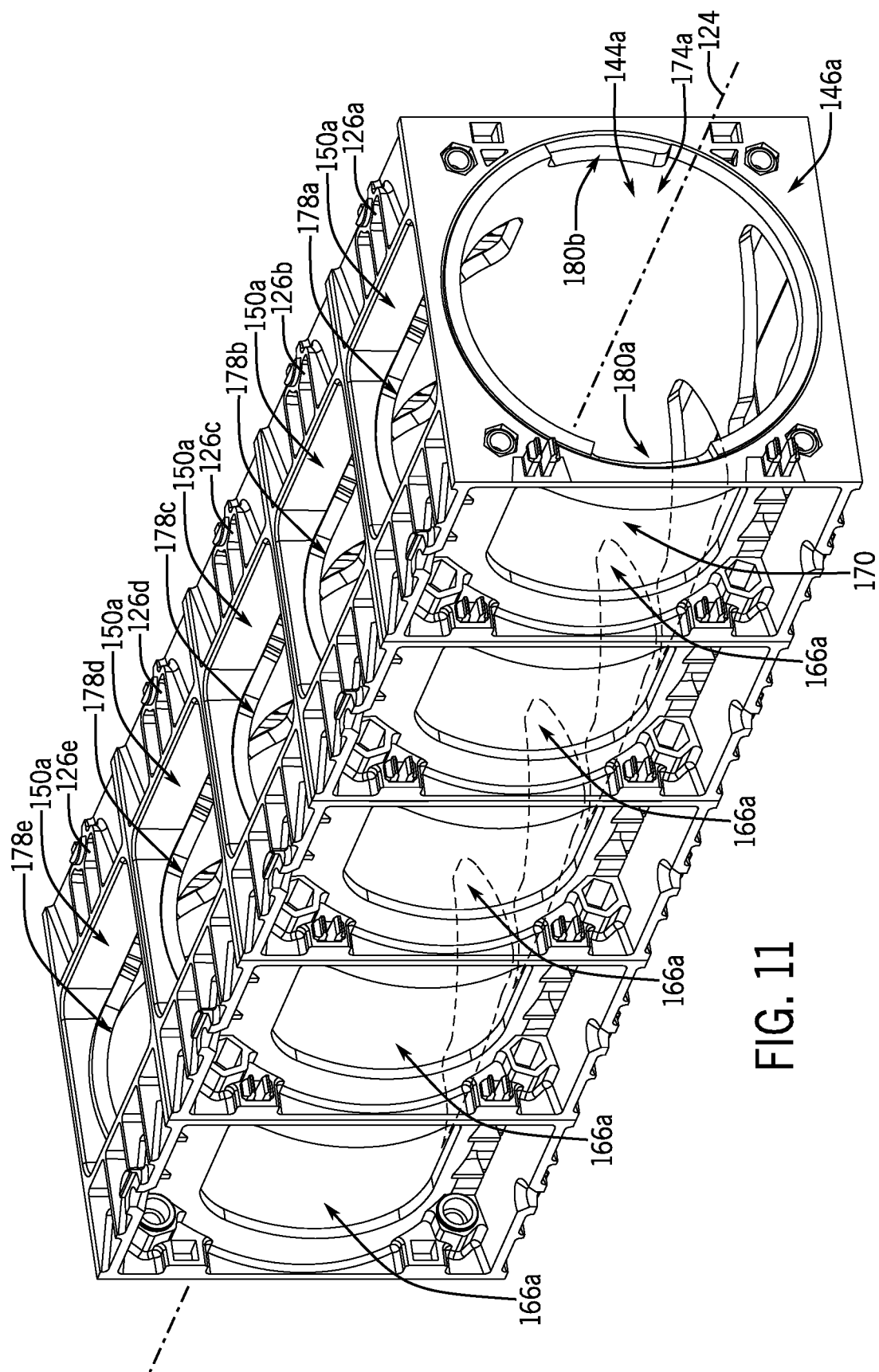
FIG. 11 illustrates an isometric view of a plurality of meter housings connected together to form a metering bank with a support element contained in the metering bank in accordance with an aspect of the invention.

Referring in particular to FIGS. 7-9, the meter housing 126 could comprise a frame 140 having multiple frame openings. Each opening can be arranged to expose an interior cavity 142 of the frame 140. The openings can include first and second frame openings 144a, 144b arranged on first and second sides 146a, 146b of the frame 140, respectively. The first and second sides 146a, 146b can be opposing sides of one another along the longitudinal axis 124 of the frame. The first and second frame openings 144a, 144b can be configured, with sufficient size and geometry, to receive a meter wheel 128 in a form fit manner for placement in the interior cavity 142. The openings in the frame 140 can also include third and fourth frame openings 150a, 150b arranged on third and fourth sides 152a, 152b of the frame, respectively. The third and fourth sides 152a, 152b can be opposing sides of one another transverse to the longitudinal axis 124. The third and fourth frame openings 150a, 150b can be configured to provide an inlet and an outlet, respectively, relative to a meter wheel 128 when placed in the interior cavity 142. In particular, the inlet could be placed proximal to (arranged below) a particular gate of the array of electronically actuated gates 121 for receiving particulate material, while the outlet could be placed proximal to (arranged above) a particular supply line 102 for distributing particulate material in an airflow (see also FIG. 4). Moreover, a spacer 129 can be arranged on each side of the meter housing 126 to confine particulate material received through the inlet to the given modular meter assembly. The frame 140 could be substantially cubic as shown in FIG. 8.

Figure 18:
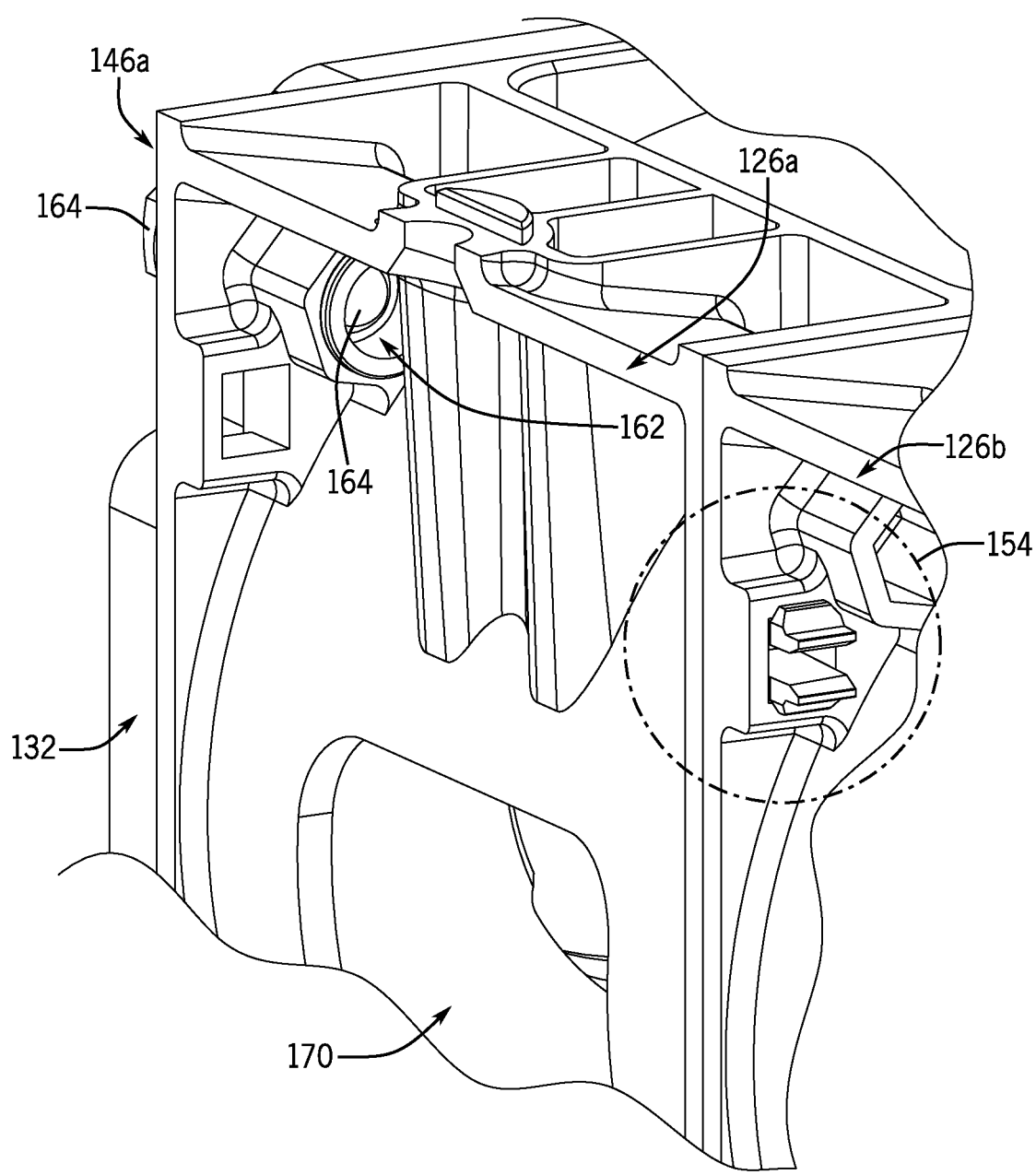
FIG. 18 illustrates an isometric detailed view of a fastener mounting an end cap to a meter housing containing a support element in accordance with an aspect of the invention.

The meter housing 126 could further comprise an interconnection system 154 provided symmetrically on the first and second sides 146a, 146b (opposing sides) of the frame 140. The interconnection system 154 can be configured to allow the frame 140 to attach to additional frames on the first and second sides 146a, 146b. In one aspect, the interconnection system 154 could comprise at least one male connector, which could comprise a pair of flexible locking tabs 156, and at least one female connector, which could comprise a receptacle 158 configured to receive the pair of flexible locking tabs 156, on each of the first and second sides 146a, 146b (see also FIG. 18 illustrating in interconnection between a pair of flexible locking tabs 156 of a first meter housing 126 and a receptacle 158 of a second meter housing 126 in a bank). In one aspect, the at least one male connector on the first side 146a can be provided on an end of the first side 146a nearer to a fifth side 160a; the at least one female connector on the first side 146a can be provided on an end of the first side 146a nearer to a sixth side 160b, the at least one male connector on the second side 146b can be provided on an end of the second side 146b nearer to the sixth side 160b and the at least one female connector on the second side 146b can be provided on an end of the second side 146b nearer to the fifth side 160a. In another aspect, the interconnection system 154 can consist of two male connectors, one above another, and two female connectors, one above another, on each of the first and second sides 146a, 146b, as shown. Accordingly, the two male connectors on the first side 146a can be provided on an end of the first side 146a nearer to the fifth side 160a; the two female connectors on the first side 146a can be provided on an end of the first side 146a nearer to the sixth side 160b, the two male connectors on the second side 146b can be provided on an end of the second side 146b nearer to the sixth side 160b and the two female connectors on the second side 146*b* can be provided on an end of the second side 146*b* nearer to the fifth side 160*a*.

Each meter housing 126 could further include apertures 162 configured to receive fasteners 164 on each of the first and second sides 146*a*, 146*b* (see FIGS. 8 and 18) for mounting an end cap 132. The apertures 162 could be arranged at each corner of the first and second sides 146*a*, 146*b*, symmetrically, to accommodate fastening an end cap 132 thereto on either side.

In one aspect, the openings in the frame 140 can also include fifth and sixth frame openings 166*a*, 166*b* arranged on the fifth and sixth sides 160*a*, 160*b* of the frame, respectively (the fifth and sixth sides 160*a*, 160*b* being opposing sides of one another transverse to the longitudinal axis 124). The fifth and sixth frame openings 166*a*, 166*b* can be configured to reduce an amount of material of the frame 140 while still providing rigid structural support.

Referring in particular to FIGS. 10-13, a support element 170 can be arranged in each modular meter assembly 122. The support element 170 can be contained between the meter housing 126 and the meter wheel 128 of each modular meter assembly 122. The support element 170 could comprise a tubular sleeve 172 having first and second ends 174*a*, 174*b* and multiple sleeve openings 178. The first and second ends 174*a*, 174*b* can be configured, with sufficient size and geometry, to receive a meter wheel 128 for placement in an interior cavity 176 of the sleeve 172 in a form fit manner. The sleeve openings 178 can be arranged to expose the interior cavity 176 on a length of the sleeve. The sleeve openings can include first and second sleeve openings 178*a*, 178*b* arranged on opposing sides of one another along the longitudinal axis 124. The first and second sleeve openings 178*a*, 178*b* can be arranged to correspond to the first and second frame openings 144*a*, 144*b* of the modular meter assembly 122, for each module meter assembly 122, to provide the inlet and the outlet (relative to the meter wheel 128) of each the meter assembly 122, respectively.

The tubular sleeve 172 can further include a sleeve locking element 180 configured to prevent rotation of the sleeve 172 relative to a meter housing 126, modular meter assembly 122, and metering bank 120, when the sleeve 172 is contained therein. The sleeve locking element 180 could be disposed on a circumference of either or both ends of the sleeve 172, such as on a circumference of the first end 174*a*, the second end 174*b*, or both as shown. Multiple sleeve locking elements 180, such as first and second sleeve locking elements 180*a*, 180*b*, could be provided on a single end of the sleeve 172, which could be arranged opposite of one another on the circumference of the end of the sleeve 172. Each sleeve locking element 180 can be configured to prevent rotation of the sleeve 172 relative to the meter housing 126 by correspondingly engaging an end plate locking element 182 (see FIGS. 15-18) of an end plate 184 mounted to the meter housing 126. In one aspect, the sleeve locking element 180 can comprise one or more slots on a circumference of an end of the sleeve 172, and the end plate locking element 182 can comprise one or more protrusions on the end plate 184, with the one or more slots correspondingly engaging the one or more protrusions. Moreover, the one or more slots can be curved, along the circumference of the sleeve 172, so as to engage one or more protrusions that are also curved.

In one aspect, the sleeve 172 can have sufficient length to structurally support the entire metering bank 120 with a single structure. The sleeve 172 could be, for example, at least 16 inches in length along the longitudinal axis 124. However, in another aspect, as shown in FIG. 13, an alternative sleeve 172' can have a shortened length along the longitudinal axis 124 corresponding to a length of a modular meter assembly 122 along the longitudinal axis 124. In this instance, the sleeve 172 could be, for example, less than 5 inches in length along the longitudinal axis 124.

Referring in particular to FIGS. 15-18, a bearing end cap 132 can be mounted to a modular meter assembly 122 at one or both ends of a metering bank 120. The end cap 132 could comprise a plate 184 including multiple openings. The openings can include a central opening 186 configured to support the bearing assembly 134, for supporting rotation of the rotatable shaft 130, and the rotatable shaft 130 for rotating the meter wheel 128 of each modular meter assembly 122. The openings can also include multiple fastener openings 188. Each fastener opening 188 can be smaller than the central opening 186. Each fastener opening can be configured to receive a fastener 164 for mounting the plate 184 to the meter housing 126. In one aspect, the fastener openings 188 can consist of four fastener openings, 188*a*-188*d*, each fastener opening being arranged near a corner of the plate 184.

The plate 184 can further include the aforementioned end plate locking element 182 configured to prevent rotation of the sleeve 172 relative to the meter housing 126 when the plate 184 is mounted to the meter housing 126 containing the sleeve 172. In one aspect, the end plate locking element 182 can comprise one or more protrusions extending normal to the plate 184, and the sleeve locking element 180 can comprise one or more slots on a circumference of an end of the sleeve 172, with the one or more protrusions correspondingly engaging the one or more slots. Moreover, the one or more protrusions can be curved, arranged opposite of one another on the plate 184 with the central opening 186 in between, so as to engage one or more slots that are also curved.

The plate 184 can further include a recess 190 configured to allow the interconnection system 154 of the meter housing 126 (for connecting to another meter housing 126), such as the pair of flexible locking tabs 156, to extend from the meter housing 126 without interference by the plate 184. In one aspect, recesses 190 can consist of four recesses, 190*a*-190*d*, each recess being arranged near a corner of the plate 184, so as to allow symmetrical mounting of the plate 184 in any orientation without interference from the interconnection system 154.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A meter housing for a modular meter assembly for distributing particulate material from an applicator, the meter housing comprising:
   a frame defining a plurality of openings, each opening of the plurality of openings being arranged to expose an interior cavity of the frame, the plurality of openings comprising:
      first and second openings arranged on first and second sides of the frame, respectively, the first and second sides being opposing sides of one another along a longitudinal axis of the frame, the first and second openings being configured to receive a meter wheel for placement in the interior cavity;

third and fourth openings arranged on third and fourth sides of the frame, respectively, the third and fourth sides being opposing sides of one another transverse to the longitudinal axis, the third and fourth openings being configured to provide an inlet and an outlet, respectively, relative to a meter wheel when placed in the interior cavity; and fifth and sixth openings arranged on fifth and sixth sides of the frame, respectively, the fifth and sixth sides being opposing sides of one another transverse to the longitudinal axis, the fifth and sixth openings being configured to reduce an amount of material of the frame; and an interconnection system provided symmetrically on the first and second sides of the frame, the interconnection system being configured to allow the frame to attach to additional frames on the first and second sides.

2. The meter housing of claim 1, wherein the interconnection system comprises at least one male connector and at least one female connector on each of the first and second sides.

3. The meter housing of claim 2, wherein:
the at least one male connector comprises a pair of flexible locking tabs, and
the at least one female connector comprises a receptacle configured to receive the pair of flexible locking tabs.

4. The meter housing of claim 2, wherein the at least one male connector on the first side is provided on an end of the first side nearer to the fifth side, the at least one female connector on the first side is provided on an end of the first side nearer to the sixth side, the at least one male connector on the second side is provided on an end of the second side nearer to the sixth side and the at least one female connector on the second side is provided on an end of the second side nearer to the fifth side.

5. The meter housing of claim 2, wherein the interconnection system consists of two male connectors and two female connectors on each of the first and second sides.

6. The meter housing of claim 5, wherein the two male connectors on the first side are provided on an end of the first side nearer to the fifth side, the two female connectors on the first side are provided on an end of the first side nearer to the sixth side, the two male connectors on the second side are provided on an end of the second side nearer to the sixth side and the two female connectors on the second side are provided on an end of the second side nearer to the fifth side.

7. The meter housing of claim 2, further comprising apertures configured to receive fasteners on each of the first and second sides.

8. The meter housing of claim 1, wherein the frame is substantially cubic.

9. A method for distributing particulate material from a modular meter assembly, the method comprising:
providing a frame defining a plurality of openings, each opening of the plurality of openings being arranged to expose an interior cavity of the frame, the plurality of openings comprising:
first and second openings arranged on first and second sides of the frame, respectively, the first and second sides being opposing sides of one another along a longitudinal axis of the frame, the first and second openings being configured for receiving a meter wheel for placement in the interior cavity; and
third and fourth openings arranged on third and fourth sides of the frame, respectively, the third and fourth sides being opposing sides of one another transverse to the longitudinal axis, the third and fourth openings providing an inlet and an outlet, respectively, relative to a meter wheel when placed in the interior cavity; and fifth and sixth openings arranged on fifth and sixth sides of the frame, respectively, the fifth and sixth sides being opposing sides of one another transverse to the longitudinal axis, the fifth and sixth openings being configured to reduce an amount of material of the frame; and providing an interconnection system symmetrically on the first and second sides of the frame, the interconnection system allowing the frame to attach to additional frames on the first and second sides.

10. The method of claim 9, further comprising the interconnection system providing at least one male connector and at least one female connector on each of the first and second sides.

11. The method of claim 10, further comprising:
providing the at least one male connector as a pair of flexible locking tabs, and
providing the at least one female connector as a receptacle for receiving the pair of flexible locking tabs.

12. An agricultural application implement comprising:
an implement frame;
a plurality of wheels supporting the implement frame;
a metering section supported on the implement frame, the metering section comprising a plurality of metering banks, each metering bank comprising:
a plurality of modular meter assemblies, each modular meter assembly of the plurality of modular meter assemblies comprising:
a meter housing, the meter housing comprising:
a frame defining a plurality of openings, each opening gf the plurality of openings being arranged to expose an interior cavity of the frame, the plurality of openings comprising:
first and second openings arranged on first and second sides of the frame, respectively, the first and second sides being opposing sides of one another along a longitudinal axis of the frame; and
third and fourth openings arranged on third and fourth sides of the frame, respectively, the third and fourth sides being opposing sides of one another transverse to the longitudinal axis, the third and fourth openings being configured to provide an inlet and an outlet, respectively, for distributing particulate material; and
an interconnection system provided symmetrically on the first and second sides of the frame, the interconnection system being configured to allow the frame to attach to additional frames on the first and second sides; and
a meter wheel received within the interior cavity; and
a sleeve received in the interior cavity of the frame of at least one of the plurality of modular meter assemblies, the meter wheel of each of the at least one of the plurality of modular meter assemblies being rotatable within the sleeve.

13. The implement of claim 12, wherein the interconnection system comprises at least one male connector and at least one female connector on each of the first and second sides.

14. The implement of claim 13, wherein:
the at least one male connector comprises a pair of flexible locking tabs, and the at least one female connector comprises a receptacle configured to receive the pair of flexible locking tabs.

15. The implement of claim 13, wherein the plurality of openings further comprises fifth and sixth openings arranged on fifth and sixth sides of the frame, respectively, the fifth and sixth sides being opposing sides of one another transverse to the longitudinal axis, the fifth and sixth openings being configured to reduce an amount of material of the frame.

* * * * *